(12) United States Patent
Schwegler et al.

(10) Patent No.: US 6,182,502 B1
(45) Date of Patent: Feb. 6, 2001

(54) DIAGNOSTIC MODULE FOR TESTING THE TIGHTNESS OF A CONTAINER

(75) Inventors: Helmut Schwegler, Pleidelsheim; Manfred Zimmermann, Bad Rappenau, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/242,667

(22) PCT Filed: Apr. 4, 1998

(86) PCT No.: PCT/DE98/00965
§ 371 Date: Feb. 22, 1999
§ 102(e) Date: Feb. 22, 1999

(87) PCT Pub. No.: WO98/59230
PCT Pub. Date: Dec. 30, 1998

(30) Foreign Application Priority Data

Jun. 23, 1997 (DE) ................................................ 197 26 559

(51) Int. Cl.[7] .......................... G01M 3/32; G01M 15/00; G01M 3/26
(52) U.S. Cl. .......................... 73/49.2; 73/49.7; 73/118.1; 123/520
(58) Field of Search .................... 73/49.2 T, 40.5 R, 73/49.7, 40, 118.1; 123/520, 518, 519

(56) References Cited

U.S. PATENT DOCUMENTS

| | | | |
|---|---|---|---|
| 5,168,748 | * 12/1992 | Flora, Jr. et al. | 73/49.2 |
| 5,295,391 | * 3/1994 | Mastandrea et al. | 73/49.2 |
| 5,408,866 | * 4/1995 | Kawamura et al. | 73/40 |
| 5,426,938 | * 6/1995 | Ogawa et al. | 60/285 |
| 5,467,641 | * 11/1995 | Williams et al. | 73/49.7 |
| 5,483,935 | * 1/1996 | Ogawa et al. | 123/421 |
| 5,507,176 | * 4/1996 | Kammeraad et al. | 73/49.2 |
| 5,637,788 | * 6/1997 | Remboski et al. | 73/40.5 R |
| 5,765,539 | * 6/1998 | Isobe et al. | 123/520 |
| 5,817,925 | * 10/1998 | Cook et al. | 73/40 |
| 6,044,314 | * 3/2000 | Cook et al. | 701/31 |

* cited by examiner

Primary Examiner—Hezron Williams
Assistant Examiner—David J. Wiggins
(74) Attorney, Agent, or Firm—Ronald E. Greigg; Edwin E. Greigg

(57) ABSTRACT

In a diagnosis module for leak testing a container of a tank ventilation system of a motor vehicle, which has a reference leak through which a volume flows and is matched to a permissible leakage of the container. The reference leak is constituted by a number of diaphragms disposed in series in the flow direction, in which each of the diaphragms have a throttle opening (25 27). The advantage of this diagnosis module lies in the large diameter throttle openings, which are less susceptible to malfunction when there is a permitted leakage hole that has a significantly smaller diameter.

9 Claims, 2 Drawing Sheets

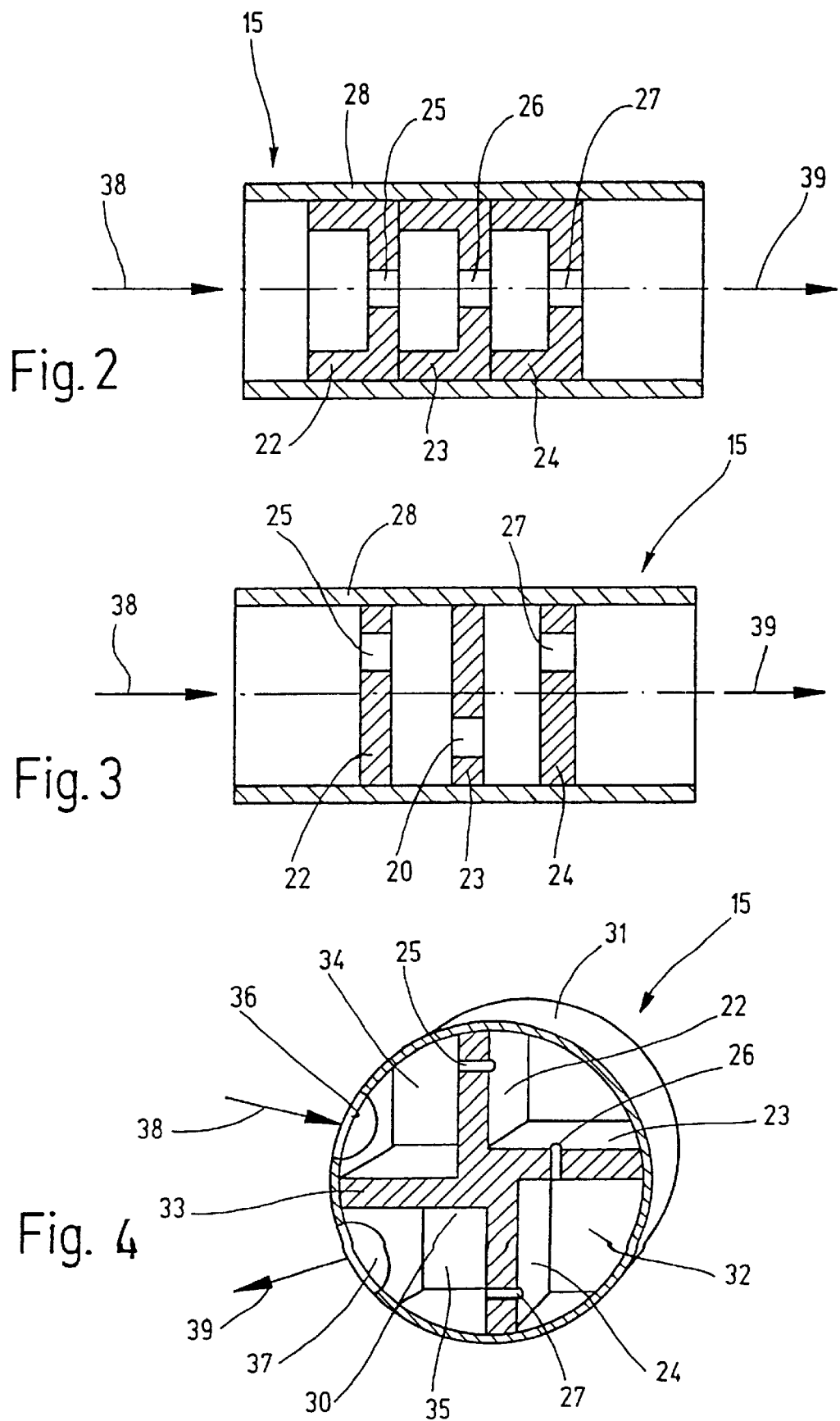

DIAGNOSTIC MODULE FOR TESTING THE TIGHTNESS OF A CONTAINER

PRIOR ART

The invention relates to a diagnosis module for leak testing a container, in particular a tank ventilation system of a motor vehicle.

In a wide variety of technical fields, containers must be tested as to their functionality, i.e. leakproofness. It is thus important to leak test containers, for example in the chemical industry or in process technology. In addition, however, it is also necessary in automotive engineering to leak test containers, in particular tank systems. So for example, in some countries, the functionality of tank ventilation systems in vehicles must be tested with on-board means. Starting with the model year 1996, leaks of 1 mm must be detectable and starting with the model year 2000, even leaks 0.5 mm in size must be detectable. In order to detect such leaks, a so-called diagnosis module is installed, with which a leak test can be carried out from time to time.

The proposal has already been made to equip such a diagnosis module with an electric compressed air pump and a reversing valve that is embodied, for example, as a 4/2-way solenoid valve and to connect it on the valve end to the container to be monitored or to the tank ventilation system (DE 196 36 431). In its first switched position, the reversing valve shuts off the compressed air supply from the compressed air pump and ventilates the connection line between the reversing valve and the container and in its second switched position, connects the compressed air pump to the container with the connection line while simultaneously shutting off the ventilation. The reference leak, which is comprised of a throttle bore with a defined bore diameter, is disposed parallel to the reversing valve and connects the compressed air pump to the connection line between the reversing valve and the container. A measuring unit is connected to the electrical connection of the compressed air pump and measures the current consumption of the compressed air pump as a measurement for the volume flow supplied by the compressed air pump.

For leak testing, the supply volume flow of the compressed air pump is determined on the one hand, when the compressed air pump acts on the container in the second switched position of the reversing valve, and on the other hand, when the compressed air pump acts on only the reference leak in the first switched position of the reversing valve. A comparison of the two values makes it possible to tell whether a leak is still of a permissible size or has exceeded this amount.

With this diagnosis module, component tolerances and external influences such as temperature are largely precluded since the comparison of the two measurement values is made in relation to the reference measurement and external influences do not change decisively during the measurement. However, the reference leak is extremely important for correct measurement since it defines the threshold limit for a good/bad identification of leakproofness. It must therefore be assured that the cross section of the reference leak does not change with the passage of time, for example does not become smaller due to soiling. Since leak testing—as described at the beginning—is increasingly being accommodated to smaller leaks, the throttle bore of the reference leak in the known diagnosis module must likewise be made very small, as a result of which the susceptibility of the reference leak to soiling and thereby to a change of the opening cross section increases significantly and the measurements of leakproofness are no longer reliable.

ADVANTAGES OF THE INVENTION

The diagnosis module according to the invention has the advantage over the prior art that through the connection of a number of diaphragms in series, each with a throttle opening, the volume flow permitted for the reference measurement is adjusted with throttle openings that are relatively large in cross section, which in contrast to throttle bores with very small bore diameters, are relatively insensitive to soiling, deposits, impurities, etc. Therefore, in addition, the filters usually inserted before and after the reference leak in the known diagnosis module can be eliminated. For technical manufacturing reasons, the large cross section throttle openings are easier to produce than small ones so that rugged stamping tools can be used. The influences of stamping tolerances are just as noncritical as the influences of various deflashing qualities since they are of much less consequence than a significantly greater opening cross section.

Trials have shown that for example, the reference leak according to the invention, which is equipped with three diaphragms disposed in series and whose throttle openings each have a diameter of 1 mm, permits the same through flow, i.e. the same supply volume flow per unit time, as a single throttle bore with a diameter of 0.5 mm. With four and more diaphragms disposed in series, with the same size diameter of the throttle openings, the through flow quantity can be further reduced so that future requirements to discover extremely small leakages in the container can also be fulfilled with the diagnosis module according to the invention, without the diagnosis module measuring imprecisely or failing completely due to changes in the reference leak with long-term operation.

Advantageous improvements and updates of the diagnosis module disclosed are possible by means of the measures taken herein.

BRIEF DESCRIPTION OF THE DRAWINGS

The invention will be explained in more detail in the description below, in conjunction with exemplary embodiments represented in the drawings.

FIG. 4 is a cross section of a third exemplary embodiment of the reference leak in a perspective representation.

DESCRIPTION OF THE EXEMPLARY EMBODIMENTS

Figure 1:
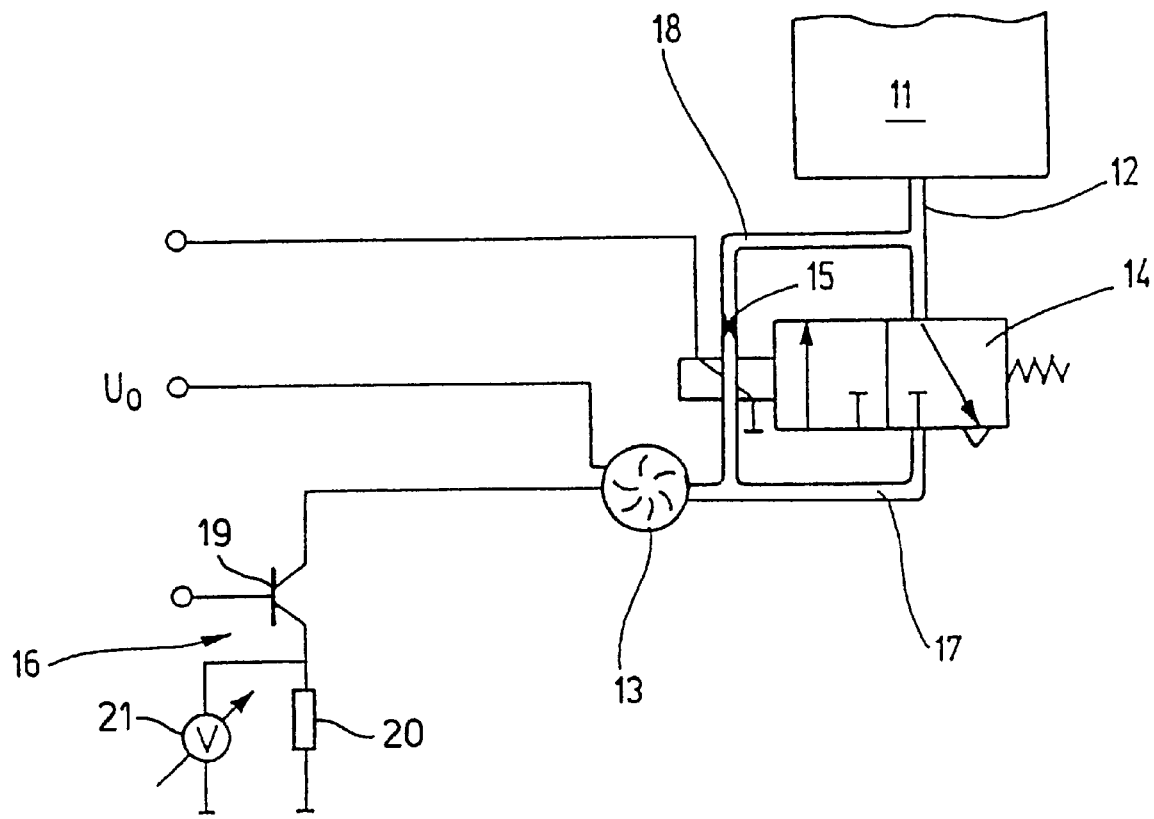
FIG. 1 is a block circuit diagram of a diagnosis module for a tank ventilation system of a motor vehicle, FIGS. 2 and 3 each show a longitudinal section through a reference leak in the diagnosis module according to FIG. 1 according to a first and a second exemplary embodiment.

The diagnosis module depicted in the block circuit diagram in FIG. 1 is used to leak test a tank ventilation system of a motor vehicle as a particular exemplary embodiment for an arbitrary container. As is known and is described, for example, in DE 195 02 776 C1, in addition to the tank, the tank ventilation system includes an adsorption filter which is connected to the tank by way of a tank connection line and has a ventilation line connected to the environment, as well as a tank ventilation valve, which on the one end, is connected to the adsorption filter by way of a valve line and on the other end, is connected to an intake tube of an internal combustion engine by way of another valve line. As a result of evaporation, hydrocarbons are produced in the tank, which are adsorbed in the adsorption filter. In order to regenerate the adsorption filter, the tank ventilation valve is opened so that due to the vacuum prevailing in the intake tube, air from the atmosphere is sucked through the adsorption filter, by means of which the hydrocarbons adsorbed in the adsorption filter are sucked into the intake tube and are supplied to the internal combustion engine. Part of the adsorption filter of this known tank ventilation system is represented in FIG. 1 and is labeled 11.

The diagnosis module is connected to the ventilation line 12 of the adsorption filter. The diagnosis module has an electric compressed air pump 13 that is connected to a voltage source $U_0$, a reversing valve 14 that is embodied as a 4/2-way valve, a reference leak 15, as well as a measurement circuit 16 that is for measuring the current consumption of the compressed air pump 13 as a measure for the air volume flow supplied by the compressed air pump 13. The reversing valve 14 connects a compressed air line 17, which leads away from the compressed air pump 13, with the ventilation line 12 to the adsorption filter 11. The reversing valve 14, which has two switched positions, is embodied so that in the normal position of the reversing valve 14 shown in FIG. 1, the compressed air line 17 is closed and the ventilation line 12 is ventilated, and in the working position of the reversing valve 14, the compressed air line 17 is connected to the ventilation line 12 and the ventilation opening of the reversing valve 14 is closed. The reference leak 15 is disposed in a bypass line 18, which connects the compressed air line 17 to the ventilation line 12, bypassing the reversing valve 14.

The compressed air pump 13 is controlled by means of a transistor 19. In order to determine the current consumption of the compressed air pump 13 when it is switched on, the measurement circuit 16 has a measurement resistor 20, which is connected in the emitter branch of the transistor 19. The decreasing voltage at the measurement resistor 20, which is detected by means of a voltage meter 21, is a measure for the current consumption and therefore for the supply volume flow of the compressed air pump 13.

For leak testing, the compressed air pump 13 is turned on and by switching the reversing valve 14, on the one hand, acts on the tank ventilation system with compressed air and on the other hand, acts on only the reference leak with compressed air. A comparison of the air flow supplied by the compressed air pump 13 in the two switched positions of the reversing valve 14, which is proportional to the measurement values read out on the voltage meter 21, permits a determination to be made as to the existence of a leak in the tank ventilation system. If the measurement value read out on the voltage meter 21 in the working position of the reversing valve 14 is greater than the measurement value read out in the normal position of the reversing valve 14, then the tank ventilation system has a leak that is greater than the permissible leakage, which is determined by the reference leak 15. Hence, based on the diagnosis, a negative conclusion is drawn regarding leakproofness. In the other case, a positive conclusion is drawn, i.e. that the tank ventilation system is leakproof.

The threshold for the positive/negative conclusion is predetermined by the reference leak 15, which should be sized in accordance with the permissible leakage in the tank ventilation system. If a leak of 0.5 mm diameter is to be detected in the tank ventilation system, then the reference leak 15 must be correspondingly set. In order not to have to also provide an extremely small throttle bore in the reference leak 15 that corresponds to the permissible leak, the reference leak 15, as shown in an enlarged depiction in FIGS. 2 and 3, is composed of a number of diaphragms 22–24 disposed in series in the flow direction, each of which has a throttle opening 25–27. The diaphragms 22–24 are embodied as disk-shaped in FIG. 3 and are disposed spaced apart from one another in a sleeve 28. For a simplified assembly of the reference leak 15, the diaphragms 22–24 can also be embodied as cup-shaped, as shown in FIG. 2, and can adjoin one another in the axial direction, wherein the cup height determines the axial spacing of the diaphragms 22–24 from one another, an inlet 38 for the air flow is embodied on the sleeve 28 before the first diaphragm 22, and an outlet 39 for the air flow is embodied after the third diaphragm 24. The inlet 38 and outlet 39 are symbolically indicated by arrows in FIGS. 2 and 3. In FIG. 2, the throttle openings 25–27 in the diaphragms 22 24 are disposed so that their opening axes point in the flow direction and are aligned with one another. In the exemplary embodiment in FIG. 3, the opening axes of the throttle openings 25–27, which likewise point in the flow direction, are offset from one another in parallel. If all of the throttle openings 25–27 in the diaphragms 22–24 have a diameter of 1 mm, for example, then a through flow per unit time is produced which corresponds to the through flow when there is a reference leak which has a single throttle bore with a diameter of 0.5 mm. This means that through the series connection of the three diaphragms 22–24 in order to produce a relatively small reference leak, the throttle openings 25–27 can be made quite large in diameter. Throttle openings with large cross sections are significantly much less sensitive to soiling and deposits than throttle openings with small cross sections. Also, they are less critical with regard to manufacture tolerances such as stamping and deflashing qualities.

The reference leak 15 depicted in a perspective cross section in FIG. 4 functions according to the same basic principle with three diaphragms 22–24 disposed in series, which each in turn have a larger diameter throttle opening 25–27 than the one that corresponds to the maximally permitted leak in the tank ventilation system. The diaphragms 22–24 are embodied on an extrusion profiled part 30, which is axially inserted into a cylindrical housing 31. The housing 31 can naturally also be embodied as box-shaped. The two end faces of the housing 31 are closed by covers, of which only the end cover 32 can be seen in FIG. 4. The diaphragms 22–24, which extend from the housing axis to the housing walls are disposed at right angles to one another. A fourth wall 33 likewise aligned at right angles to the diaphragms 22–24, which is likewise embodied on the extrusion profiled part 30 and extends from the housing axis to the housing wall, is used to divide an inlet chamber 34 from an outflow chamber 35, which chambers are respectively embodied before the first diaphragm 22 and after the last diaphragm 24. In the vicinity of the two chambers 34, 35, the housing 31 has connection openings 36 and 37, respectively, for integrating the throttle diaphragm into the bypass 18. As in the exemplary embodiments in FIGS. 2 and 3, the connection opening 36 and the inlet chamber 34 constitute the inlet 38, and the outflow chamber 35 and the connection opening 37 constitute the outlet 39 of the reference leak 15. The connection openings 36, 37 are laid out so that the axes of the inlet 38 and outlet 39 are approximately at right angles to or are inclined at a slightly acute angle to the axis of the extrusion profiled part 30. The disposition of the throttle openings 25–27 corresponds approximately to the disposition of the throttle openings 25–27 in FIG. 3, i.e. their opening axes are not aligned with one another, that is, do not lie on an arc concentric to the housing axis, but are offset parallel to it in the radial direction. The function of the reference leak 15 in FIG. 4 is identical to that of the previously described reference leak according to FIGS. 2 and 3.

The foregoing relates to preferred exemplary embodiments of the invention, it being understood that other variants and embodiments thereof are possible within the spirit and scope of the invention, the latter being defined by the appended claims.

What is claimed is:

1. A diagnosis module for leak testing a container of a tank ventilation system of a motor vehicle, comprising a reference leak (15) that provides a flow through by a volume flow and is matched to a permissible leakage of the container, the reference leak (15) is constituted by a number of diaphragms (22–24) disposed in series in the flow direction, each of which has a throttle opening (25–27).

2. The diagnosis module according to claim 1, in which the throttle openings (25–27) are disposed in the diaphragms (22–24) so that their opening axes point in a flow direction and are aligned with one another.

3. The diagnosis module according to claim 1, in which the throttle openings (25–27) of the diaphragms (22–24) are disposed so that their opening axes point in a flow direction and are offset from one another lateral to the flow direction.

4. The diagnosis module according to claim 2, in which the diaphragms (22–24) are embodied as disk-shaped or cup-shaped and are disposed spaced axially ap a rt from one another in a sleeve (28), and an inlet (38) and an outlet (39) are respectively provided for the volume flow on opposite end faces of this sleeve (28).

5. The diagnosis module according to claim 3, in which the diaphragms (22–24) are embodied as disk-shaped or cup-shaped and are disposed spaced axially apart from one another in a sleeve (28), and an inlet (38) and an outlet (39) are respectively provided for the volume flow on opposite end faces of this sleeve (28).

6. The diagnosis module according to claim 3, in which the flow direction and the alignment line of the axes of the throttle openings (25–27) are arc-shaped, preferably semicircular, or run at angles to one another.

7. The diagnosis module according to claim 2, in which the flow direction and the alignment line of the axes of the throttle openings (25–27) are arcshaped, preferably semicircular, or run at angles to one another.

8. The diagnosis module according to claim 6, in which the diaphragms (22–24) are embodied on an extrusion profiled part (30) which is inserted in a housing (31) and that the housing (31) has an inlet (38) and an outlet (39), the axes of the inlet and outlet are aligned approximately at right angles to the axis of the extrusion profiled part (30).

9. The diagnosis module according to claim 4, in which the inlet (38) is connected to an outlet of a compressed air pump (13) whose operating parameters, e.g. current consumption, are used as a measure for the permissible leakage.

* * * * *